UNITED STATES PATENT OFFICE.

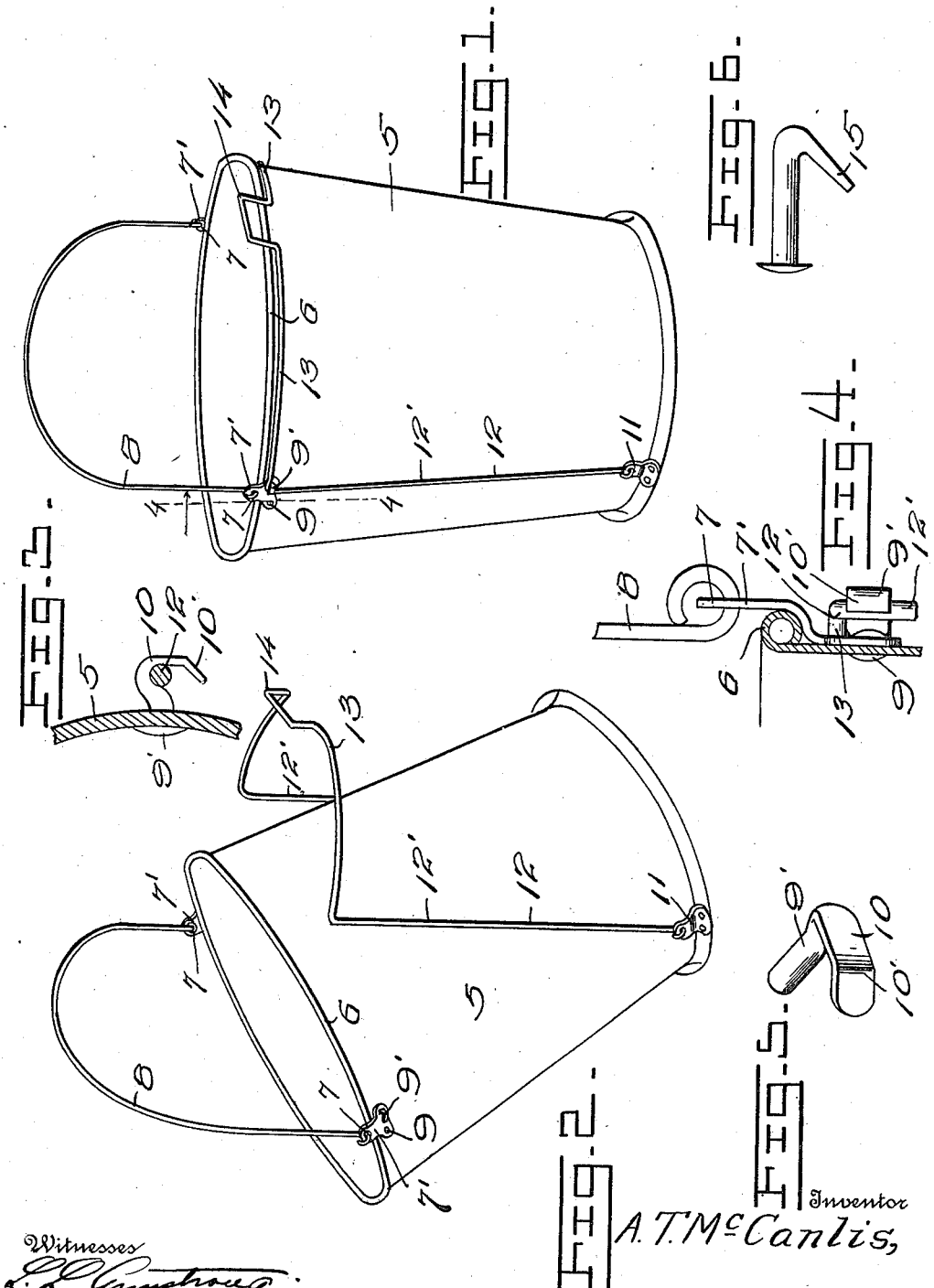

ALBERT T. McCANLIS, OF ROCKVILLE CENTER, NEW YORK, ASSIGNOR OF ONE-HALF TO LOUIS LEDER, OF ROCKVILLE CENTER, NEW YORK.

TIPPING BUCKET-HANDLE.

964,118.        Specification of Letters Patent.     Patented July 12, 1910.

Application filed August 28, 1909. Serial No. 515,055.

*To all whom it may concern:*

Be it known that I, ALBERT T. McCANLIS, a citizen of the United States, residing at Rockville Center, Long Island, in the county of Nassau and State of New York, have invented certain new and useful Improvements in Tipping Bucket-Handles, of which the following is a specification.

This invention has relation to certain new and useful improvements in pails, buckets, pans and the like, and resides primarily in the provision of a supplementary bail or handle by means of which the pail may be tipped to discharge the contents thereof.

Another object is to provide a pail attachment of this character which may be simply and inexpensively constructed, and is so positioned with relation to the pail when not in use that no inconvenience will be occasioned in the ordinary use of the pail.

A further object is to provide new and novel means for supporting the supplementary bail or handle in its inoperative position.

With these and other objects in view, the present invention consists in the combination and arrangement of parts as will be hereinafter more fully described and particularly pointed out in the appended claims, it being understood that changes in the specific structure shown and described may be made within the scope of the claims without departing from the spirit of the invention.

In the drawings forming a part of this specification, and in which like numerals of reference indicate similar parts in the several views, Figure 1 is a perspective view of a pail with my attachment shown thereon. Fig. 2 is a similar view illustrating the position of the supplementary bail member as the pail is being tipped to empty the same. Fig. 3 is an enlarged detail section showing the manner of retaining the tipping bail in its inoperative position on the sides of the pail. Fig. 4 is an enlarged detail vertical section taken on the line 4—4 of Fig. 1. Fig. 5 is a detail perspective view of one of the bail holding rivets. Fig. 6 is a detail view of a modified form of rivet.

This invention is designed with a view to facilitating the emptying of the contents of pails, buckets, cans, and various cooking utensils such as kettles, pots, etc. The device will be found particularly desirable in connection with boiling kettles, for emptying the boiling liquid therefrom, obviating the present danger of scalding the hands, as it is not necessary to touch the body portion of the kettle.

In the attachment of the objects of my invention, I employ a supplementary attachment which is permanently secured to the pail or kettle.

In the drawings there is shown a pail 5 such as is usually employed for conveying water or other liquids, the upper circumscribing edge of which is formed with a strengthening bead 6. Eyes 7 are secured at diametrically opposite points to the exterior of the pail and project above the upper edge thereof. In these eyes the ends of a carrying bail 8 are hingedly secured. The eyes 7 are formed integral with the eye plates 7′ through which securing rivets 9 and 9′ are passed and clenched upon the inner surface of the pail. Each of the rivets 9′ is formed with a flattened resilient head 10 which as shown in Fig. 5, is inclined outwardly of the periphery of the pail and then inwardly, thus forming a substantially V-shaped flattened engaging surface 10′. But one of the securing rivets of the eye plates 7′ at either side of the pail is thus formed. Eyes 11 are secured to the lower edge of the pail in vertical alinement with the eyes 7 and receive the ends of a supplementary bail or handle member 12 which are hingedly secured thereto. The bail 12 is formed of a single length of heavy wire and comprises the vertical side portions 12′, the arcuately bowed portions 13, and the central vertically curved handle portion 14. The portions 13 are of approximately the same curvature as the pail, and lie in close proximity thereto when the bail is in its inoperative position. It will be noted that the flattened heads of the rivets 9′ do not project beyond the bead 6 of the bail, and when the tipping bail 12 is disposed as shown in Fig. 1 the portions 12 and 13 thereof will be closely held in contact with the pail, and as the extremities of the heads 10 are bent inwardly, there will be no danger of the same catching in the clothing of the user as the pail is carried from place to place.

In the operation of the attachment, during the carrying of the pail the tipping bail is locked in its inoperative position in the resilient V-shaped heads of the rivets 9'. When it is desired to empty its contents, the vertical side portions 12' of the bail are forced outwardly from the heads of the rivets, the flattened ends thereof being sprung outwardly, whereupon the tipping bail is released and may be swung to the position shown in Fig. 2. The handle portion 14 and the carrying bail 8 are now grasped by the user, and the pail tipped in the lower ends of the bail 12, and the liquid contained therein rapidly discharged. It will be obvious that were the contents of the pail in a highly heated condition, the hands would be in great danger of being burned or scalded in the process of emptying the pail. The pail may be tipped to any angle desired and when returned to its normal vertical position, the side portions 12' of the tipping bail will engage with the beveled surface of the heads of the rivets 9' and are forced inwardly until the bail has passed the point of the V. The sides of the bail will ride over the inwardly turned extremities of the rivet heads and engage beneath the same. The space between the end of the head of the rivet and shank portion thereof is slightly less than the diameter of the bail. It will therefore be seen that the bail may be only disengaged from the heads of the rivets by pressure being exerted against the vertical side portions 12' thereof.

In Fig. 6 there is shown a slightly modified form of rivet which consists of a rigid metal bolt having its outer end inwardly disposed at an angle to the shank portion thereof, as shown at 15. The inner end of the bolt is of course clenched upon the surface of the pail to secure the bail eye plates thereto. When this form of rivet is used the tipping bail 12 is formed of a suitable steel wire to secure the desired resiliency, the vertical sides of the bail being forced outwardly as they engage with the inwardly inclined ends of the rivets, and snapping into position between the same and the sides of the pail.

From the foregoing it will be seen that I have provided a very useful attachment for pails, boiling kettles or other kitchen utensils whereby boiling liquids may be rapidly handled without the accompanying danger to the user of scalding or burning the hand.

The device is simple and may be manufactured at a very small expense.

The particular construction of rivet shown in the drawing may be modified in many other respects without departing from the principle of the invention.

By the use of the attachment much time and labor may be saved and a highly efficient device of great durability is provided.

What is claimed is:

1. The combination with a pail of ears carried thereby, attaching members engaged in the ears and in the pail, a carrying bail engaged in the ears, a tipping bail pivoted at its lower portion to the lower portion of the pail, said tipping bail having vertical side portions and a central handle portion, said side portions of the tipping bail being adapted for engagement with the attaching members to retain the tipping bail in inoperative position.

2. The combination with a pail, of ears located at the upper end of the pail, attaching members engaged in the ears and in the pail, a carrying bail engaged with the ears, a tipping bail including side portions and a connecting handle portion pivoted at the ends of its side portions to the lower portion of the pail, for movement to lie in close relation to the pail at times and at times to extend outwardly therefrom, said tipping bail being arranged for engagement with the attaching members of the ears to hold the tipping bail in close relation to the pail.

3. The combination with a pail of ears located at the upper portion thereof, attaching members engaged in the ears and in the pail, certain of said members being formed with flattened resilient heads substantially V-shaped in cross-section, a carrying bail having its ends engaged in the ears, a tipping bail including spaced side portions and a curved connecting handle portion, said tipping bail being pivoted at the ends of its side portions to the lower portion of the pail, for movement to lie with its curved connecting portion extending around the pail at times and at times lying in spaced relation to the pail, said side portions of the tipping bail being arranged for engagement with the V-shaped heads to hold the tipping bail in close relation to the pail.

4. The combination with a pail of a carrying bail carried by the pail, a tipping bail for the pail, said tipping bail comprising straight side portions pivoted at their lower ends to the lower portion of the pail, and a curved connecting portion arranged to receive the upper portion of the pail within its curvature, said tipping bail being movable to lie at times with its curved portion extending around the pail and with its side portions extending vertically of the pail, and at times with its side portions extending at an angle to the pail, and means for holding the tipping bail in its first named position.

5. In combination, a pail having eye plates secured at diametrically opposite points adjacent to its upper end, said pail having a circumscribing bead at its upper edge, a carrying bail secured to said eyes, one of the rivets securing each of the eye plates in position being formed with a flattened resilient head extending outwardly of the pail, said head being substantially V- shaped in cross section, the extreme end thereof being disposed inwardly, a tipping bail hingedly secured to the lower end of the pail, said bail comprising a single length of wire bent to provide the vertical side portions, lateral arcuate portions and a connecting handle portion, the vertical portions of the wire being adapted to engage and ride over the resilient rivet heads and to be positioned beneath the same, the space between the flattened head of the rivet and the shank portion thereof being less than the diameter of the bail, thereby retaining the bail in its normal position.

In testimony whereof I affix my signature, in presence of two witnesses.

ALBERT T. McCANLIS.

Witnesses:
LOUIS LEDER,
SAMUEL R. FISK.